(No Model.) 2 Sheets—Sheet 1.

E. WESTON.
WATT METER.

No. 522,949. Patented July 10, 1894.

WITNESSES:
Gustave Dieterich
H. R. Moller

INVENTOR
Edward Weston
BY Park Benjamin
his ATTORNEY.

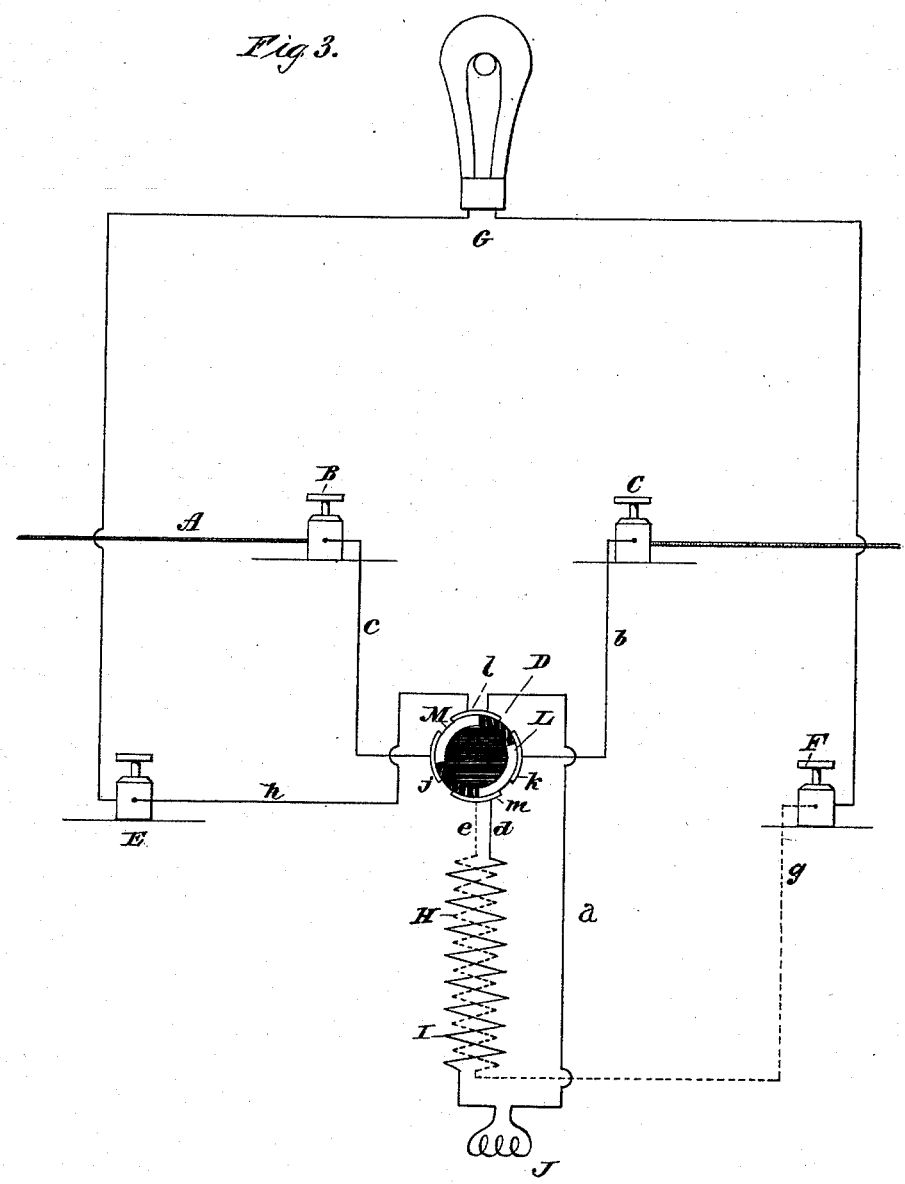

UNITED STATES PATENT OFFICE.

EDWARD WESTON, OF NEWARK, NEW JERSEY.

WATT-METER.

SPECIFICATION forming part of Letters Patent No. 522,949, dated July 10, 1894.

Application filed April 26, 1893. Serial No. 471,993. (No model.)

*To all whom it may concern:*

Be it known that I, EDWARD WESTON, of Newark, Essex county, New Jersey, have invented a new and useful Improvement in Watt-Meters, of which the following is a specification.

It is well known that the watts expended in any circuit can be ascertained by the simultaneous measurement of the current and the potential difference. My present invention is an instrument for effecting this simultaneous measurement and therefore of indicating the watts on a circuit directly; and this whether the current on said circuit be direct or alternating. It embodies two coils, one fixed and the other movable, of which, first, the fixed coil is placed in main circuit of low resistance, using a thick wire and including the lamp or other object in which the expenditure of energy is to be measured, and, second, the movable coil is arranged as a shunt to the fixed coil, which shunt includes a relatively high resistance. The movement of the movable coil is counterbalanced by a coiled spring which also serves to lead the current to said coil. By reason of this construction no manual interference is necessary to produce equilibration between the fields generated in the coils; the movable coil turning on its pivots and finding its own equilibration, so that in this way the watts are directly measured and indicated on the scale of the instrument.

The instrument to which my present invention is applied is similar in general construction to that which I have fully described and claimed in Reissue Letters Patent No. 11,250, granted to me June 28, 1892.

Figure 1:
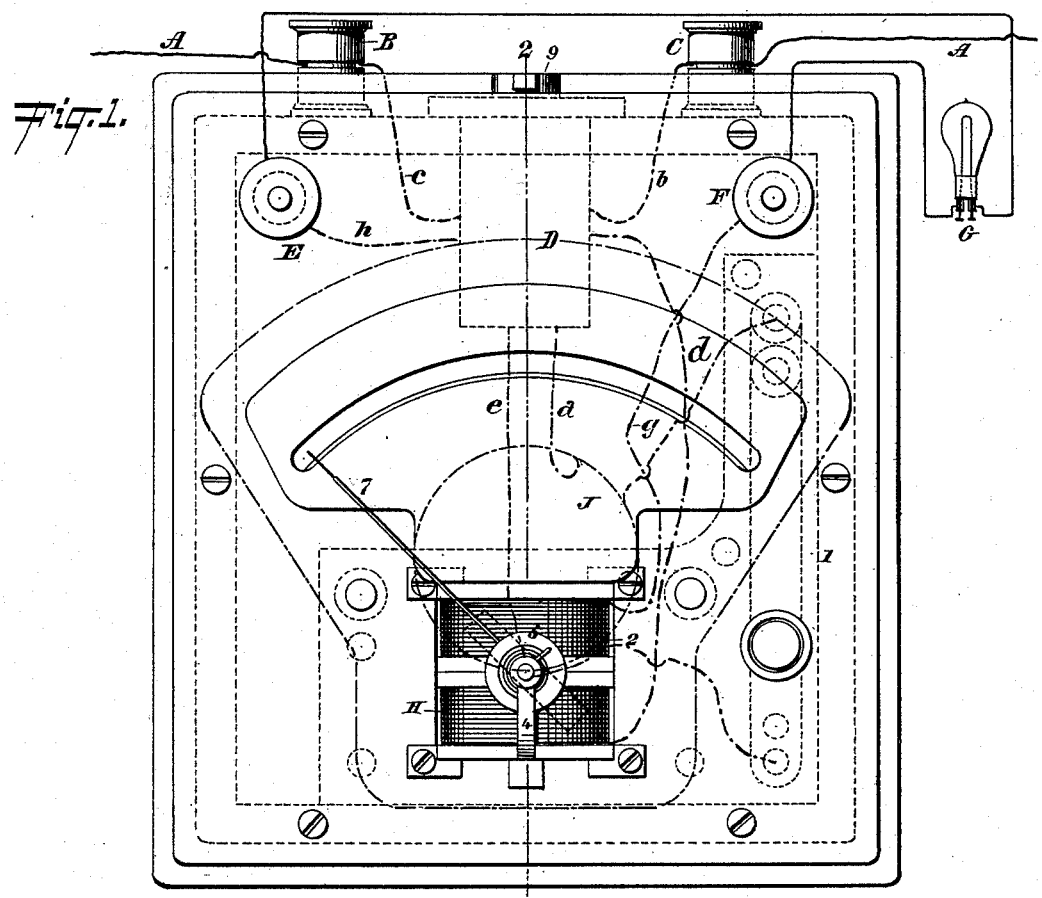
Figure 2:
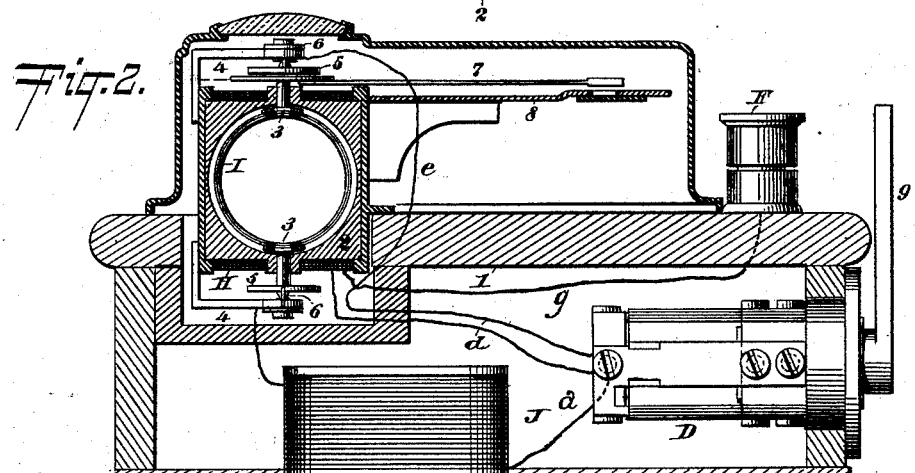

In the accompanying drawings, Figure 1 is a plan view of the instrument. Fig. 2 is a sectional view on the line 2, 2 of Fig. 1, and Fig. 3 is an electrical diagram showing the arrangements of the circuit.

Similar letters and figures of reference indicate like parts.

Referring first to Fig. 3, A is the line wire connected to the binding posts B and C, which wires are connected by the wires $c$ and $b$ to the plates $j$ and $k$ of a pole changer, D. The remaining pair of plates of the pole changer, $l$ and $m$, are connected as follows: The plate $l$ connects by wire $h$ to the binding post E, and between this binding post E and the binding post F is interposed the translating device wherein is consumed the energy which it is desired to measure; as for example, an incandescent lamp, as shown at G. The plate L of the pole changer also connects by wire $a$ with the resistance coil J and with one terminal of the movable coil I, this coil being represented symbolically by the full zigzag line, Fig. 3. The other terminal of the movable coil I is connected by wire $d$ to the plate $m$ of the pole changer D. The plate $m$ of the pole changer D is also connected by wire $e$ to a fixed coil, H, this coil being represented symbolically in Fig. 3 by a dotted zigzag line. The other terminal of the coil H is connected by wire $g$ to the binding post F. It will be clear from this disposition that if the movable coil I be disposed in the field of the fixed coil H, the instrument will measure the product of the whole current into the potential difference maintained at the terminals of the circuit of the moving coil; or in other words, the number of watts expended in the circuit.

The pole-changer D, as is here shown, and which is used only when the instrument is employed for the measurement of direct currents when it is necessary to eliminate the influence of the earth's magnetic field or of any other external field, consists simply of a central shaft or barrel of insulating material to the periphery of which are secured two plates, L and M, of conducting material. Still referring to Fig. 3, it will be plain that with the position of parts there shown the conducting plate M establishes connection between the plates $j$ and $l$ of the pole changer, and that the plate L establishes connection, at the same time, between the plates $k$ and $m$ of the pole changer. The circuits then under this condition of affairs proceed as follows: Beginning at the binding post B, by wire $c$ to plate $j$, plate $m$ and plate $l$. At plate $l$ the current divides, part going by way of wire $h$ to binding post E, lamp G, binding post F, wire $g$, fixed coil H, wire $e$, plate $m$, plate L, plate $k$, wire $b$ to binding post C and line. The other part of the current proceeding from plate $l$ goes by wire $a$ to resistance coil J, movable coil I, wire $d$, plate $m$, plate L, plate $k$, wire $b$ and binding post C, and so to line. If the pole changer be now rotated to the right so that the plate M establishes connection between the plates *l* and *k*, and the plate L establishes connection between the plates *m* and *j*, then the circuit will proceed as follows: Beginning at the binding post B, as before, by wire *c* to plate *j*, plate L, plate *m*, where the current will divide, part passing by the wire *d* through the movable coil I to resistance coil J, wire *a*, plate *l*, plate M, plate *k*, wire *b* to binding post C and to line; and part proceeding by wire *e* to fixed coil H, wire *g*, binding post F, lamp G, binding post E, wire *h*, plate *l*, plate M, plate *k*, wire *b* to binding post C and to line.

It will be observed that the effect of the pole changer is to reverse the direction of the current through the coils, so that the deflection of the instrument may be obtained in both directions and the mean of the two readings thus taken.

Referring to Figs. 1 and 2, I here show the general arrangement of the instrument which, in structural details, is substantially the same as that described in my Letters Patent aforesaid. 1 is the supporting box of the instrument having a recess in its upper side for the reception of the spool 2, upon which is wound the fixed coil H. The spool 2 has a hollow interior and receives therein the movable coil I. This coil is supported upon pivot pins, 3, which extend through the sides of the spool and are pivoted in brackets, 4. To each pin is connected a spiral spring, 5, and the outer end of each spiral spring is fastened to a pivoted arm, 6, which may be turned on the brackets so as to diminish or increase the tension of the spring. The upper pivot pin 3 carries an index needle, 7, which extends over a scale plate, 8, which is provided with a suitably-marked scale.

The arrangement of the foregoing parts being substantially the same as is set forth in my aforesaid Reissue Letters Patent, no further description is necessary.

The pole changer D is arranged within the case 1 and is provided with a lever, 9, whereby its central shaft or pin may be rotated in the manner already described. The resistance coil J is of any suitable construction and is arranged as shown within the case 1. It will be observed that the circuits in the instrument are such that the current is led into and out of the movable coil through the spiral springs 5. This arrangement and the advantages flowing from it are very fully set forth in my Reissue Letters Patent aforesaid.

I claim—

1. In a wattmeter, a fixed coil, a coil movable in the field of said fixed coil, a fixed resistance and a spring opposing and counterbalancing the impressed action of said movable coil, the said fixed coil being in main circuit and the said movable coil and resistance being in shunt circuit and circuit connections substantially as described: whereby the extent of movement of said movable coil bears a relation to and serves as a measure of the watts expended in the circuit including said fixed coil.

2. In a wattmeter, a fixed coil, a coil movable in the field of said fixed coil, a resistance, a spring opposing and counterbalancing the impressed action of said movable coil and a pole changer (the said fixed coil being in main circuit and the said movable coil and resistance being in shunt circuit and the said pole changer operating and arranged to reverse the direction of the current through said coils) and circuit connections substantially as described: whereby the extent of movement of said movable coil bears a relation to and serves as a measure of the watts expended in the circuit including said fixed coil.

3. In a wattmeter, a fixed coil, a coil movable in the field of said fixed coil, a resistance, a spring opposing and counterbalancing the impressed action of said movable coil, an index actuated by said movable coil and a scale (the said fixed coil being in main circuit and the said movable coil and resistance being in shunt circuit) and circuit connections substantially as described, whereby the said index operates to indicate on the scale the watts expended in the circuit including said fixed coil.

4. In a wattmeter, the combination of the fixed coil H, the movable coil I in the field of said fixed coil, spiral spring, as 5, opposing the movement of said movable coil, fixed resistance J, pole changer D and circuit connections, substantially as described.

EDWARD WESTON.

Witnesses:
H. R. MOLLER,
M. BOSCH.